United States Patent [19]

Scott et al.

[11] Patent Number: 4,646,512
[45] Date of Patent: Mar. 3, 1987

[54] SUGAR CANE HARVESTERS

[75] Inventors: Donald A. Scott, Pershore, England; John C. Hudson, St. Thomas, Barbados

[73] Assignee: Carib Agro-Industries Limited, St. Thomas, Barbados

[21] Appl. No.: 686,667

[22] Filed: Dec. 27, 1984

[30] Foreign Application Priority Data

Dec. 29, 1983 [GB] United Kingdom ............... 8334564

[51] Int. Cl.⁴ .......................................... A01D 45/10
[52] U.S. Cl. .................... 56/13.9; 56/14.5; 56/16.6
[58] Field of Search ............... 56/1, 13.9, 14.4, 14.5, 56/14.3, 16.6

[56] References Cited

FOREIGN PATENT DOCUMENTS 1424511 2/1976 United Kingdom ............... 56/13.9
1481955 8/1977 United Kingdom ............... 56/364
1481956 8/1977 United Kingdom ............... 56/364

Primary Examiner—Gene Mancene
Assistant Examiner—David L. Tarnoff
Attorney, Agent, or Firm—Watson, Cole, Grindle & Watson

[57] ABSTRACT

The disclosure relates to a sugar cane harvester having a pair of contra-rotating cutters to cut cane at its base and to lift the cane cut-ends first onto a conveyor which delivers the cane through de-trashing devices and then to a pair of rollers which draw the cane from the conveyor and propel it into the open end of a container against an adjustable barrier disposed along the container from said open end. The barrier is positioned to suit the length of the cane being harvested and cutters are provided to cut the cane tops from the stalks where they protrude at the open end of the conveyor to separate the tops from the stalks.

30 Claims, 20 Drawing Figures

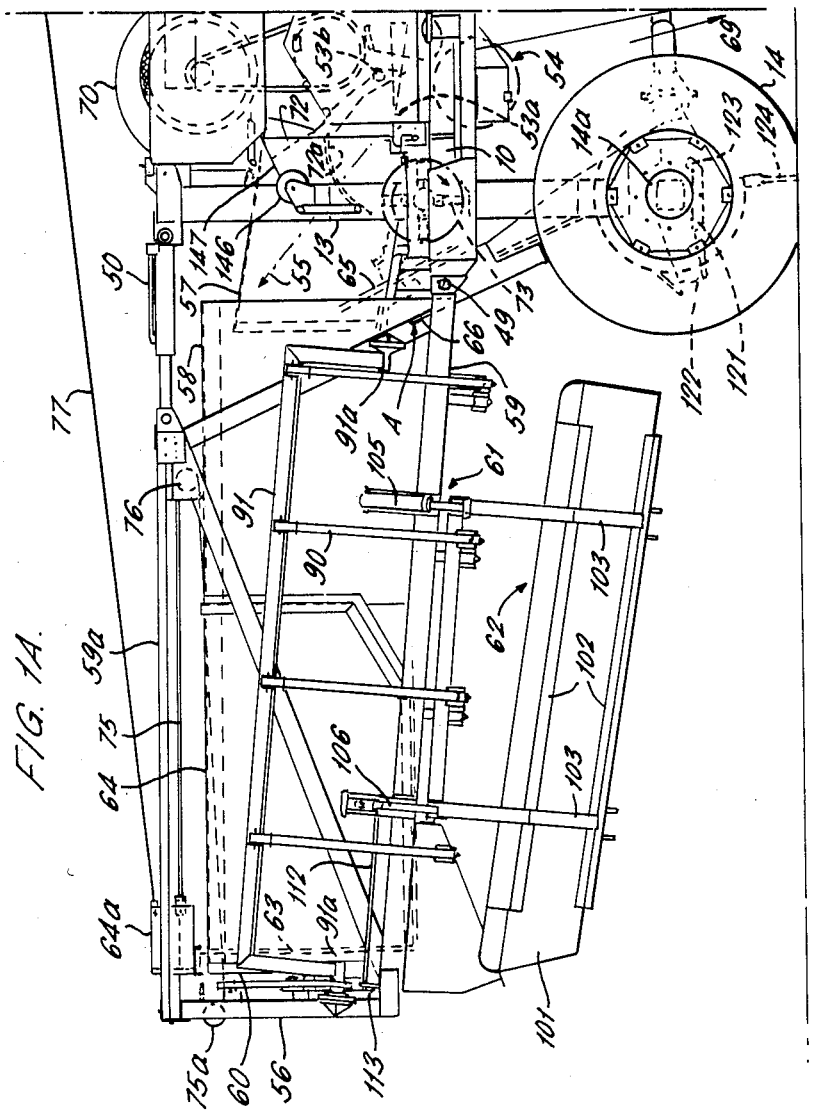

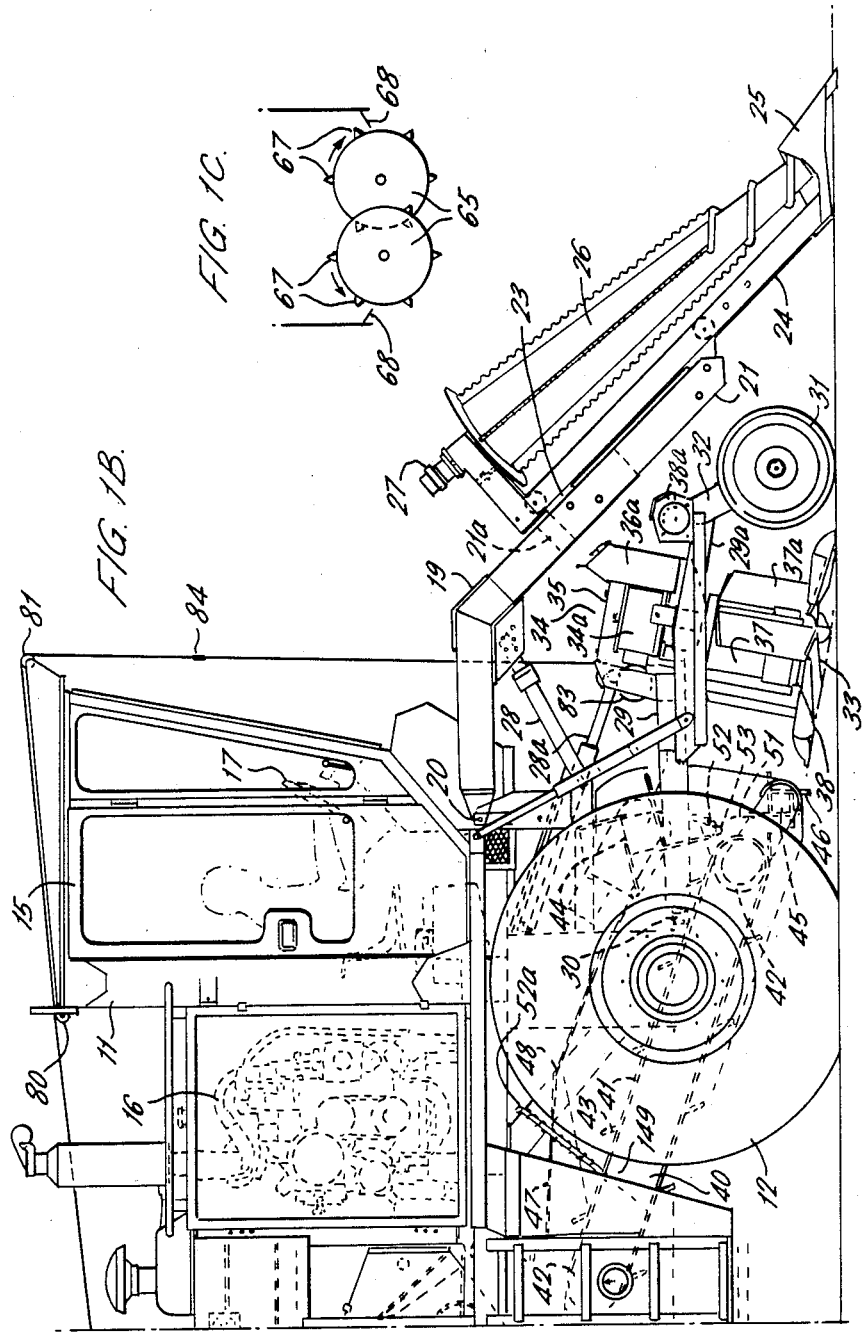

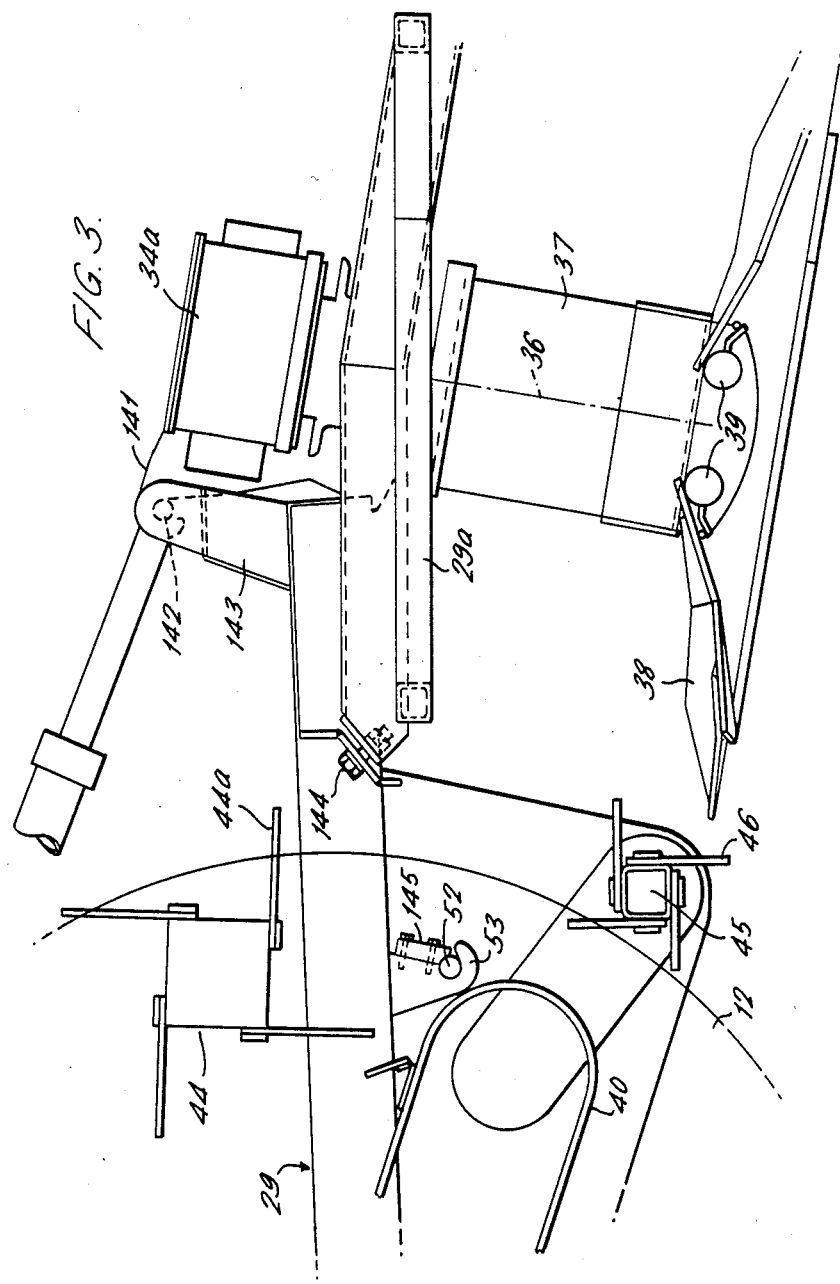

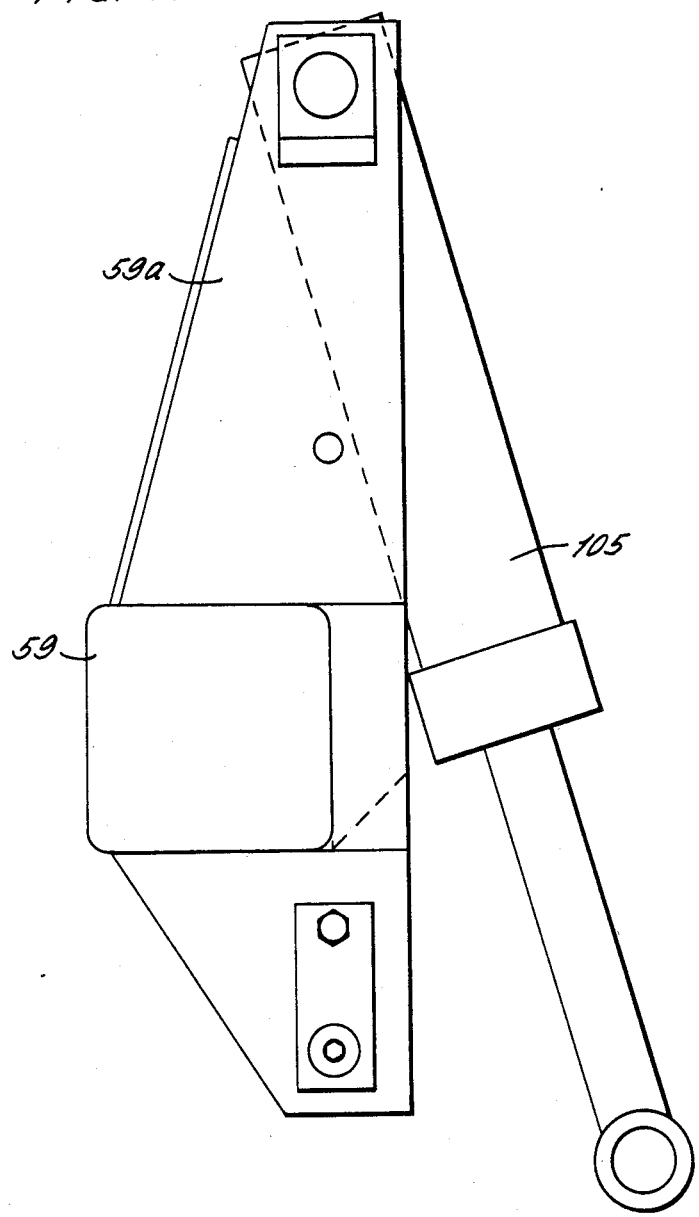

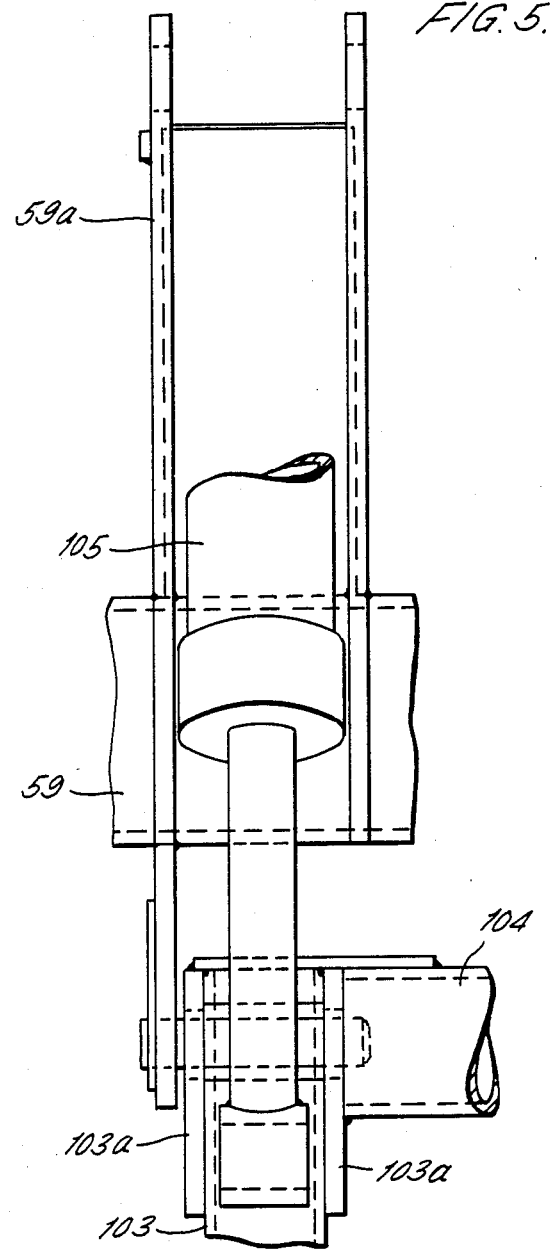

SUGAR CANE HARVESTERS

BACKGROUND OF THE INVENTION

1. Field of the Invention

This invention relates to sugar cane harvesters.

2. Description of the Prior Art

By the time the sugar cane crop is ready for harvesting, the ground at the base of the crop is covered by loose trash consisting of dead leaves, and the cane stalk has further dead and green leaves attached to it. Also, a group of long top leaves sprout from the immature tip of the cane stalk.

The harvesting of sugar cane involves cutting the crop as close as possible to ground level, removing the leaves attached along the length of each cane, separating the cane stalks from the leaves, loose trash, soil and rocks or stones, and also separating the leafy top together with the immature section, often known as the coot, from the mature part of the cane stalk. The requirements are the same even when the crop has been burnt before harvesting to reduce the volume of unwanted material.

The object of the present invention is to provide a sugar cane harvester in which the cane is cut at ground level, and the green leaf top and coot severed from the stalk, with the unwanted material separated from the cane being deposited on the ground and with the cleaned canes being accumulated and deposited in neat adjacent piles on ground locally cleared of trash, ready for mechanical loading on to cane transport.

SUMMARY OF THE INVENTION

The invention provides a sugar cane harvester having means to cut cane at its base and to lift the cut-ends of the cane from the ground, conveyor means having an input end to receive the cut ends of the cane, a container being open at one end to receive cane-cut ends first and having an adjustable barrier spaced from said open end of the container, means to propel the cane from the conveyor into the container against the adjustable barrier, the barrier being adjusted to suit the length of cane being harvested to leave the cane tops protruding from the container, cutter means adjacent the open end of the container to cut the cane tops from the stalks and means to discharge the cane stalks from the container.

The cutter means may comprise at least one disc having spaced projections around its periphery to engage and displace the cane and may also have ledge means mounted adjacent the periphery of the disc against which the cane tops are driven and severed by the projections on the disc.

More specifically two cutting discs may be provided side-by-side one another to rotate about horizontally spaced parallel axes with the adjacent peripheries of the disc overlapping each other and two ledge means are provided on either side of the pair of discs being rotated to drive the cane outwardly and downwardly on to one or other of the ledge means to sever the tops from the cane.

The conveyor means may extend upwardly and rearwardly of the base cutting means towards the container and may comprise an endless belt on which toothed bears may be mounted to engage and transport the cane and a pressure roller may be mounted adjacent the input end of the conveyor to form a nip with the upper surface of the cconveyor to receive cane from the base cutting means and to prevent the entry of large rocks and a trash removing roller at the rearward end of the conveyor.

The means to propel the cane from the conveyor into the container may comprise a pair of contrarotating power driven nip rollers.

BRIEF DESCRIPTION OF THE DRAWINGS

FIGS. 1A and 1B are enlarged views of the rearward and forward parts of the harvester as shown in FIG. 1;

FIG. 1c is a scrap view looking in the direction of the arrow A on FIG. 1A;

FIG. 3 is a detailed view of part of the cane cutting mechanism and cane conveyor mechanism of the harvester;

FIGS. 4 to 7 are detailed views of part of a mechanism for controlling the discharge of cut cane from the harvester;

DESCRIPTION OF THE PREFERRED EMBODIMENTS

Figures 1, 2:
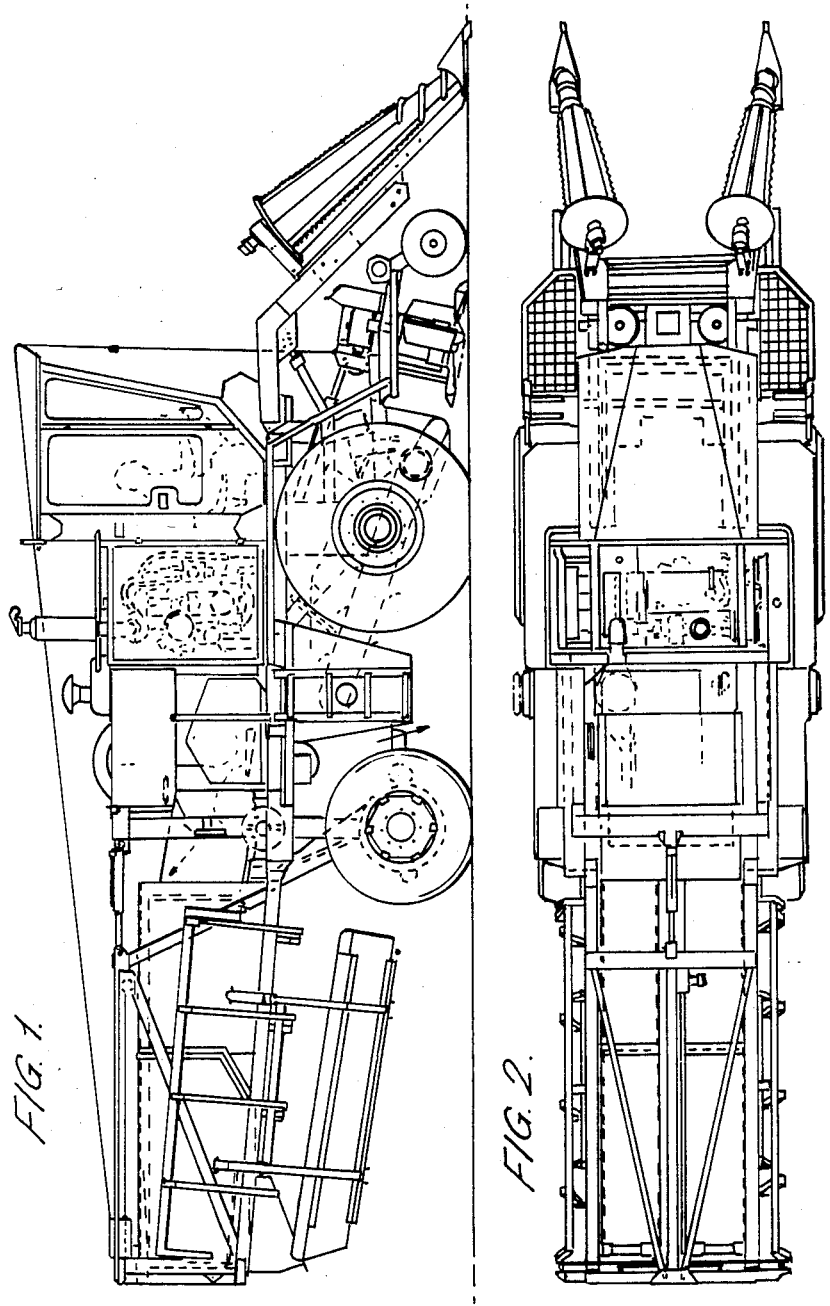
FIG. 1 is a side elevation view of a sugar cane harvester.
FIG. 2 is a diagrammatic plan view of the harvester shown in FIG. 1.
Figure 2A:
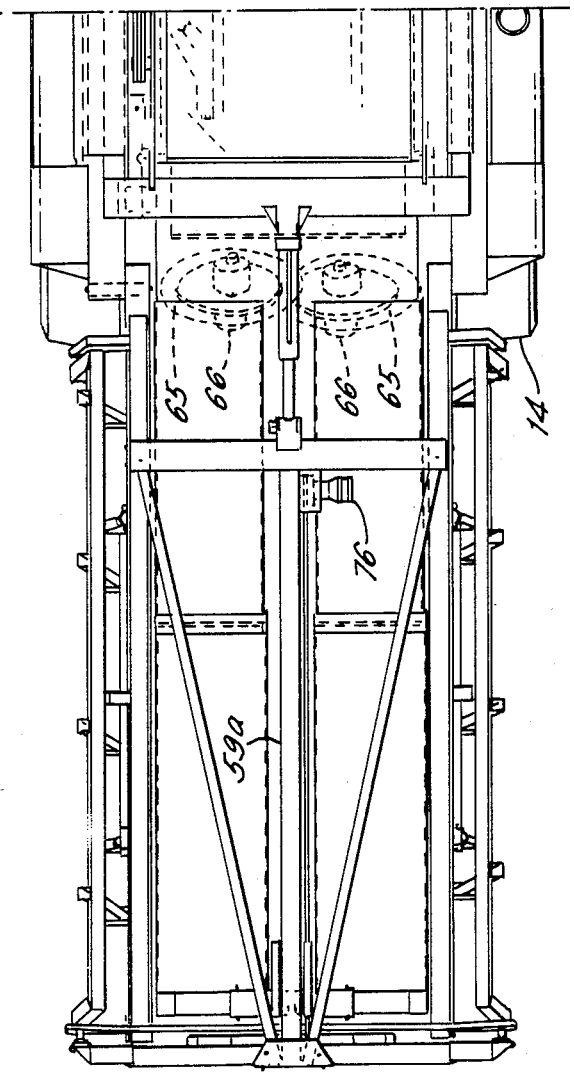
FIGS. 2A and 2B are enlarged views of the rearward and forward parts of the harvester as shown in FIG. 2.
Figure 2B:
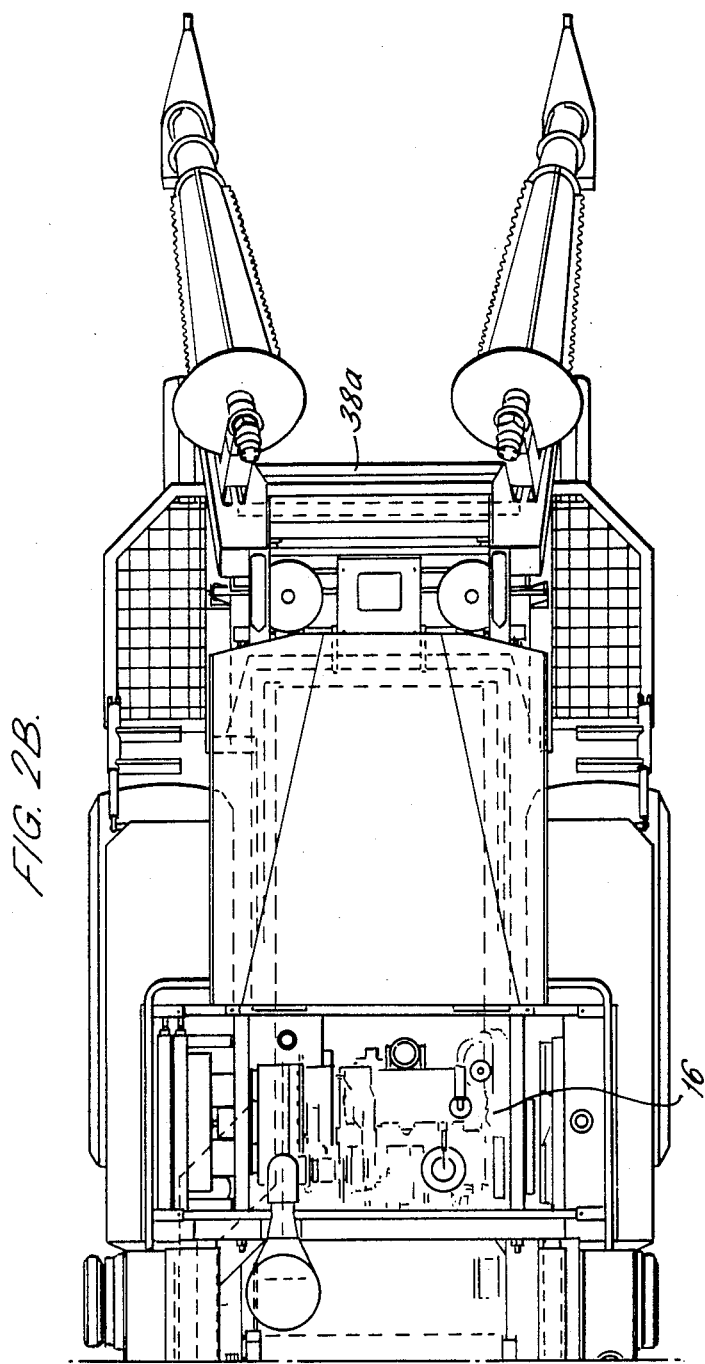

Referring firstly to FIGS. 1, 1A and 1B of the drawings, there is shown a sugar cane harvester comprising a horizontally extending ladder type chassis 10 having a front portal frame 11 on which large front wheels 12 are mounted at the lower ends and a rear portal frame 13 on which an axle 14a having smaller, rear wheels 14 are mounted. The chassis 10 has a forward control cab 15 mounted in front of the frame 11 on to which the various controls for the harvester are led and, immediately behind the cab a main power unit in the form of a diesel engine 16 is mounted on the chassis. The power unit drives one or more hydraulic pumps for producing pressurised hydraulic fluid for operating the various services of the vehicle as will be described hereinafter. Each wheel 12, and the rear axle 14a the vehicle has its own hydraulic drive motor connected to the hydraulic fluid supply for propelling the vehicle. The rear axle 14a of the vehicle is mounted to pivot about a horizontal axis and incorporates a limited-slip differential driving the wheels 14 which are connected together by a steering mechanism operated by a steering wheel 17 in the driver's cab for controlling the direction of the vehicle.

At the front of the vehicle a frame 19 is pivotally connected at 20 to the forward end of the chassis and terminating in a pair of forwardly and downwardly extending legs 21 interconnected part way down by a cross bar 21a. Each leg 21 has a pair of forwardly extending brackets 23 spaced along the leg which carry rollers (not shown) on which a frame 24 mounted parallel to the leg is supported for sliding movement parallel to the leg. The lower end of the frame carries a shoe 25 for bearing on the ground and a combing element 26 in the form of an upwardly divergent tapering roller with spiral lifting bars on its lower portion and feed bars on its upper portion is mounted on the frame and has a hydraulic drive motor 27 at the upper end of the frame rotating the roller. The rollers 26 comb through the cane as the harvester passes along the row of cane to separate the cane being cut from the cane in adjacent rows in advance of the harvester. Hydraulic rams 28 are connected between the harvester chassis and the frame 19 for raising the frame and with it the rollers 26 clear of the ground when the harvester is not in operation. Below and to the rear of the frame 19 a sub frame 29 is mounted on pivot points 30 at the lower ends of the front portal frame 11 and carries at its forward end a base cutter frame 29a on which jockey wheels 31 are mounted on adjustable legs 32 to enable the height of the base cutter frame to be adjusted in respect of the ground. The weight of the basecutting mechanism is substantially transferred on to the wheels 12 by introducing constant hydraulic pressure into the forward ends of rams 28a. These rams can also be used to raise the basecutter clear of the ground when the harvester is not in operation, and for the rapid release of the basecutter and conveyor assemblies by a method that will be described in detail later. A further use for rams 28a is to jack the front wheels of the harvester off the ground for wheel changing, by applying downward pressure to the jockey wheels 31. A pair of contra rotating base cutters indicated generally at 33 are mounted within the base cutter frame 29a to rotate about upwardly extending axes 34 spaced apart across the vehicle. Each base cutter comprises a right angle bevel gear box 34a driving a shaft 36 on which a hub 37 is mounted (FIG. 3). The horizontal shaft of each gearbox 34a is connected by chain drive 36a to a central hydraulic driving motor 35. The lower end of each hub 37 carries three spaced cutter blades 38 pivotedly mounted at 39 to the hub about generally horizontal axis to rise and fall over the ground. Each cutter blade extends outwardly and downwardly from its associated pivotal mounting and is formed at its outer extremity with an inclined cutting portion. The leading edge of the outer cutting portion of each blade is formed with a cutting edge which increases severance efficiency. Also the trailing edge of each blade is formed with an upswept portion. This causes the blades to lift the cut ends of the sugar cane as they sever it to assist in pick up of the cane as described below. The blades of the two cutter assemblies are oppositely handed and the chain transmission 36a causes them to contra rotate in synchronism. The cutter blades sever the cane adjacent the ground and since the blades are flexing up and down relative to the rotating hub, it is possible for the blades to follow the contours of uneven ground without digging into the ground or riding over any cane stalks. The hubs 37 carry rubber pads 37a to assist the rearward feed of the canes. The comb assembly at the front of the harvester and the cutter assembly are generally as described in our U.K. Pat. No. 1424511 to which reference should be made for a more detailed description.

A feed roller 38a with horizontal axis and driven by a hydraulic motor is mounted in front of the basecutters and assists the rearward flow of cane, particularly in heavy crops.

Behind the cutter assembly there is an upwardly and rearwardly extending endless conveyor 40 driven by a chain mechanism from a hydraulic motor (not shown). The conveyor comprises a belt 41 extending around spaced chain driven rollers 42 and having a plurality of outwardly facing bars or tines 43 to engage the cane. At the forward lower end of the conveyor there is a nip roller 44 (which may be mounted on a pivoted arm) fitted with rubber paddles 44a spaced over the end of the conveyor also driven by chain mechanism from a hydraulic motor. Immediately below the forward end of the conveyor and adjacent the sweep of the cutter blades of the cutter mechanism there is a roller 45 driven by chain mechanism from the forward roller 42 of the conveyor and having outwardly projecting paddle blades 46 (FIG. 3) to engage and assist in guiding the cut ends of the cane upwardly into the nip between the forward end of the conveyor and the roller 44. Once engaged on the conveyor the canes are delivered cut-ends first upwardly and rearwardly towards the back of the conveyor.

Adjacent the back of the conveyor a pressure sheet 47 is mounted to pivot about an axis 48 at one end of the sheet, the other end of the sheet bearing on the cane on the conveyor to assist in preventing the conveyor slipping past the cane.

The conveyor mechanism, its hydraulic motor and chain drive, the nip roller 44 and the paddle blade roller 45 are all mounted between a pair of cheek plates 51 each having an outwardly projecting pin 52 which engages in an upwardly facing hook 53 on the sub frame 29 to support the cheek plate assembly at its forward end. The rear end of the assembly is supported by chains 52a from the vehicle chassis 10.

Figure 6:
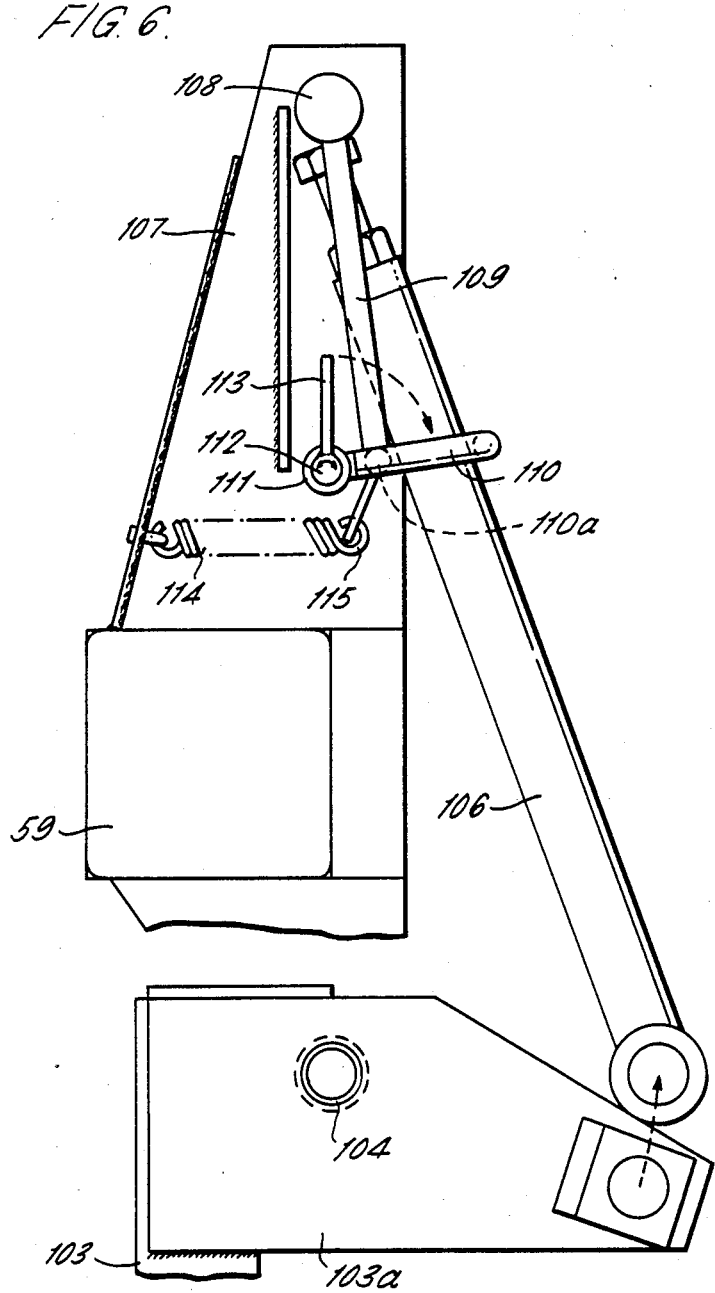
Figure 7:
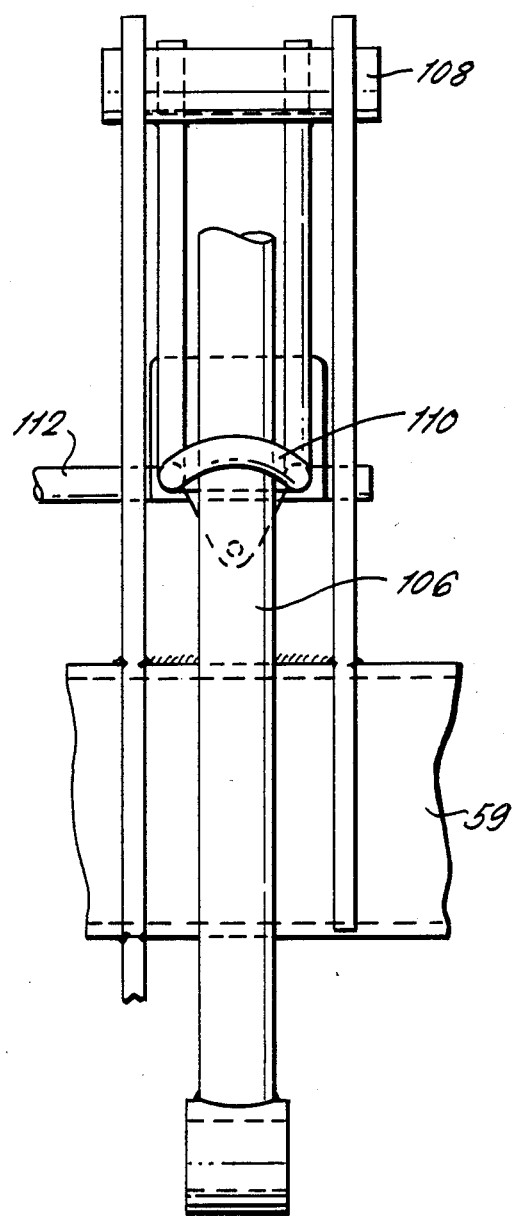
Figure 8:
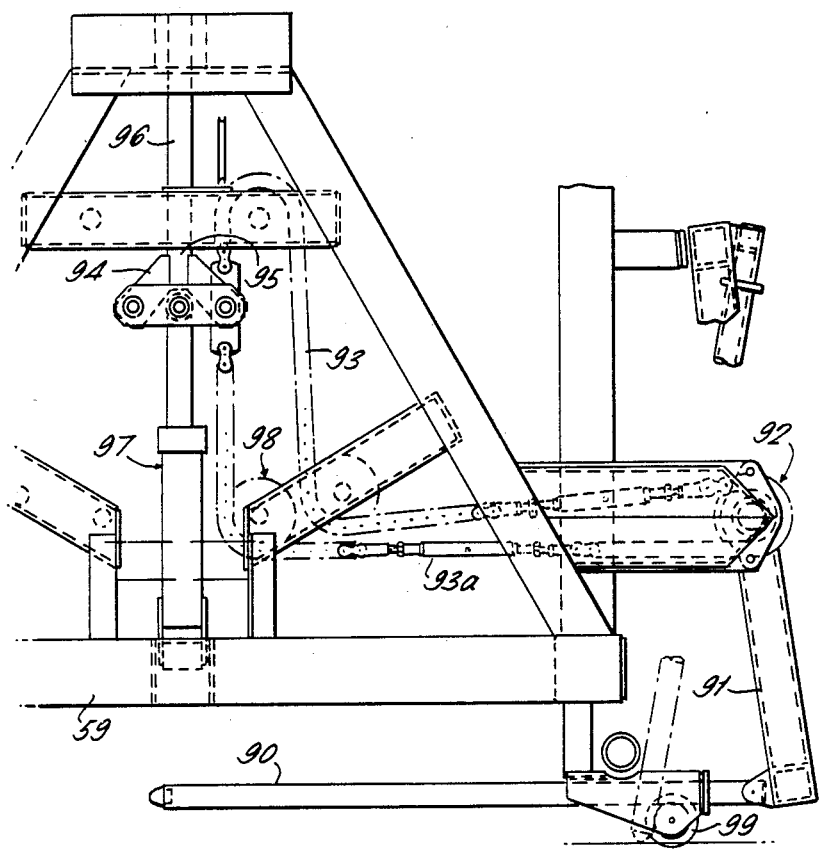
FIG. 8 is a diagrammatic view of the mechanism for controlling discharge of cane from the collection container of the harvester.

Movement of the subframe 29 about its pivots 30 under the action of rams 28a is also used to couple and uncouple both the basecutter assembly and the conveyor. The basecutter frame 29a is provided with a pair of hooks 141 (FIG. 3) which engage with extended ram pins 142 carried in lugs 143 at the front end of subframe 29. Rearward extending arms of the basecutter frame 29a are connected by a pair of bolts 144 to lugs projecting sideways from subframe 29. Releasing bolts 144 and lowering subframe 29 releases pins 142 from hooks 141 and the vehicle can then be reversed away from the basecutter assembly which rests on the ground. Further lowering of subframe 29 allows the front end of the conveyor assembly to rest on the ground and be disengaged from subframe 29 by releasing blocks 145 each side. By using hand winch 146 from which extends cable 147 passing over pulley block 148 (not shown) and connected to one side of the conveyor assembly at lug 149, support chains 52a can be disconnected and the rear end of the conveyor assembly lowered to the ground. The vehicle can then be reversed away from the conveyor assembly which is resting on the ground. Both the conveyor and the basecutter assemblies can be reassembled back onto the harvester in the reverse order. Above and to the rear of the rearward end of the conveyor a pair of nip rollers 53 and 54 are mounted on the vehicle chassis which have resilient treaded outer surfaces. Roller 53 is mounted on a pair of radius arms pivoted at 53a so that it can rise and fall and the two radius arms are connected by a torque rod 53b. The rollers may be generally of the form described and illustrated in FIG. 6 of U.K. Pat. No. 1481955 in which further reference should be made or alternatively the lower roller 54 may be constructed of a rigid cylindrical drum fitted with resilient treaded pads. The rollers are both chain driven from a hydraulic drive motor (not shown) and the chain drive is arranged to make them contra rotate together. As the cane is thrust rearwardly and upwardly by the conveyor, the cut ends of the cane enter the nip between the rollers 53, 54 which are rotated at speed to draw in and accelerate the cane rearwardly and upwardly along the path indicated at 55 into a rear container of the harvester indicated generally at 56 and mounted on the rearward portal frame 13 of the harvester at horizontal axis pivot points 49 and raised and lowered by hydraulic ram 50.

The container comprises an entry duct 57 attached to the rear portal frame 13, a further duct 58 attached to the perimeter frame 59, and a moving section 64 supported by a carriage 64*a* running along a longitudinal member 59*a*. The moving section 64 has an end wall 60 to the forward face of which is attached a cushioning sheet 63 to prevent damage to the cut ends of the cane as they strike it. The container has an opening bottom gate indicated generally at 61 for releasing cane from the container on to a pair of 'bomb' doors disposed below the bottom gate and indicated generally at 62. The bottom gate and bomb doors will be described in further detail later.

The moving section 64, together with its end wall 60 are adjusted lengthwise so that the canes propelled into the container by the nip rollers 53 and 54 are stopped by the end wall 60 when the top of the cane is in the correct position to be severed by the pair of contra rotating cutter discs 65 mounted on the portal frame 13 adjacent the open end of the container and driven by hydraulic motors 66. Each cutter disc is formed with a plurality of spaced projecting teeth 67 around its periphery which lodge against the cane and draw the cane down onto anvils in the form of ledger plates 68 mounted on either side of the assembly of cutter discs to sever the tops of the canes from the stems. The canes are thus cut to a consistent length which is adjusted by moving the end wall 60 along the container in accordance with the height of the cane being cut. The cane tops and other trash exit through the gap in front of the rear wheels of the vehicle indicated at 69 assisted by an air blast from a hydraulic driven fan 70 mounted behind the engine 16 and having a downwardly directed outlet 72 generally in front of the cutter discs 65. A number of resilient tines 72*a* are positioned between the rollers 53, 54 and the cutter discs 65, lying across the cane flow, and supported at their upper ends. The spacing between these tines is such that they allow free passage of canes into the container 56 but catch and deflect the loose trash so that it is thrown downwardly under the combined action of the air blast from fan 70 and the flail carrying rotor 73 which is mounted on the chassis 10 immediately in front of the cutter discs 65 and driven by a hydraulic motor not shown which is rotated in a direction to engage and throw free trash and tops from the cane downwardly along the path 69.

In order to adjust the position of the end wall 60 of the container, a hydraulic motor 76 drives an endless chain 75 around a sprocket 75*a*. The moving carriage 64*a* is attached to the endless chain 75 and so is moved longitudinally by the hydraulic motor 76. In order to indicate the position of the end wall 60 to the driver, a cable 77 is attached to it and extends through pulleys 80, 81 over the cab 15 of the harvester and downwardly onto a take up reel 83 mounted on the sub-frame 29. Indicator 84 is attached to the wire to indicate the position of the barrier wall 60 in the container to the driver in such a way that the height of the indicator represents the level at which the standing cane will have its tops removed. Referring now to FIGS. 4 to 7 and 8 of the drawings, the bottom opening mechanism of the container will now be described.

Two "bomb" doors 62 comprising sheets of weldmesh or rubber 101 supported on frames 102 are mounted on the container frame 59 beneath the doors 90 to receive cane falling from the container. Each bomb door has two upwardly extending arms 103 the upper ends of which are connected by a tube 104 which has pivotal mountings at spaced locations along the container frame 59. Outwardly extending lugs 103*a* are formed on each forward arm 103 and downwardly extending hydraulic rams 105 are mounted on brackets 59*a* on the frame 59 of the container adjacent the forward arms and are connected to the lugs of the forward arms to swing the bomb doors open and closed as required. Rods 106 of similar proportions to the rams are pivotally connected to lugs 103*a* on the rearward arms. The upper end of each rod 106 extends into a housing 107 mounted on the frame 59. At the upper end of the housing 107 there is a stop 108 to limit upward movement of the rod 106 when the rod is aligned with the stop and to prevent opening of the bomb door. Two legs 109 extend downwardly from the stop and, between them, support a U-shaped member 110 having a cross-piece 110*a* to hold the rod 105 captive on the stop. The ends of the U-shaped rod bear on a rotatable cam plate 113 on a spindle 112 turned by an arm 113*a* (not shown) and the tension spring 114 acts between the base of the housing 107 and a lug 115 attached to the U-shaped member to hold the member against the cam. When the cam plate 113 is in the upright position as shown, the U-shaped member 110 holds the upper end of the bar 106 in engagement under the stop 108 and prevents the bomb doors on that side of the vehicle from opening. When the cam plate is rotated along the dotted part indicated through about 80°, the U-shaped member 110 is urged outwardly of the housing 107 carrying with it the upper end of the bar 106 to clear the upper end of the bar from the stop 108. When the ram 105 for opening bomb door is operated, the bar 108 can then rise through the U-shaped member 110 past the stop 108 allowing the bomb door to open.

The arms 113*a* (not shown) at the rear ends of the spindles 112 are linked by a cross rod 116 (not shown) so that when one cam plate 113 is engaged the other is disengaged. The cross rod 116 is connected by cable to a control in the cab so that the driver can select on which side of the centre line to deposit the cane.

In order to prevent canes which are being projected into the container when the bomb doors 62 are open, from falling to the ground untidily, eight rigid tines 90 are moved transversely across the bottom of the container just before the bomb doors are opened, to accumulate the canes entering the container while the bomb doors are open. The tines 90 are withdrawn just after the bomb doors have closed, allowing the accumulated canes to fall into the lower part of the container.

The four tines 90 on each side are pivotally connected to a tine bar 91 which can be rotated through 180° about pivots 91*a* arranged substantially longitudinally. A chain sprocket 92 is attached to one end of the tine bar and rotated by an endless chain 93 having two tensioners 93*a* and passing over three idler sprockets 98. The vertical portion of the chain on each side is connected to a hydraulic ram 97 by means of a common draw member 94 having an upwardly projecting rod 95 extending into a guide tube 96 to guide the member for vertical movement. The draw member 94 is raised and lowered by ram 97 to rotate the two tine bars simultaneously. Each tine 90 is constrained by a guide roller 99 so that the tip follows a substantially horizontal lateral path in and out underneath the container.

In order to avoid unwanted trash being picked up during the subsequent loading operation, together with the deposited cane pile, a trash bar 121 on which flexible rubber tines 122 are mounted, is pivoted underneath the rear axle 14a at pivots 123 and is lowered by hydraulic ram 127 (not shown) into the position shown at 124, to comb trash from the ground onto which the cane pile is to be deposited.

Figure 9:
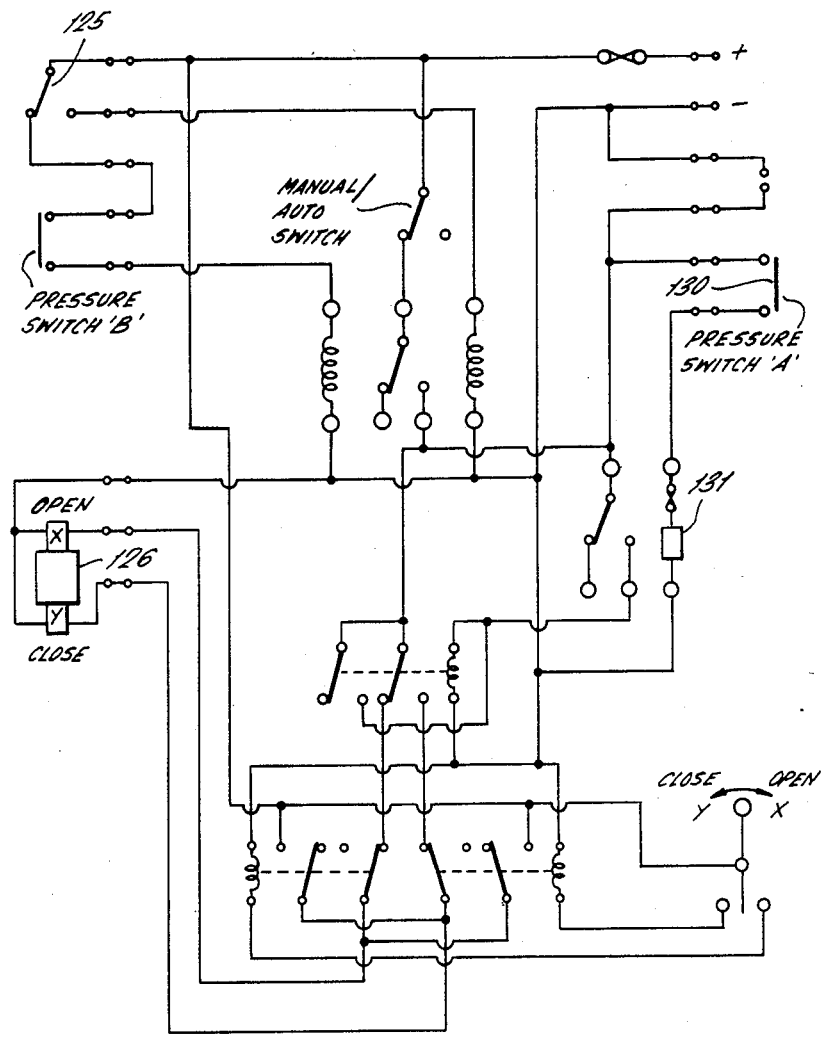
FIGS. 9 and 10 show in diagrammatic form electrical and hydraulic circuits of a control system for providing automatic dumping of harvested cane from the harvester.
Figure 10:
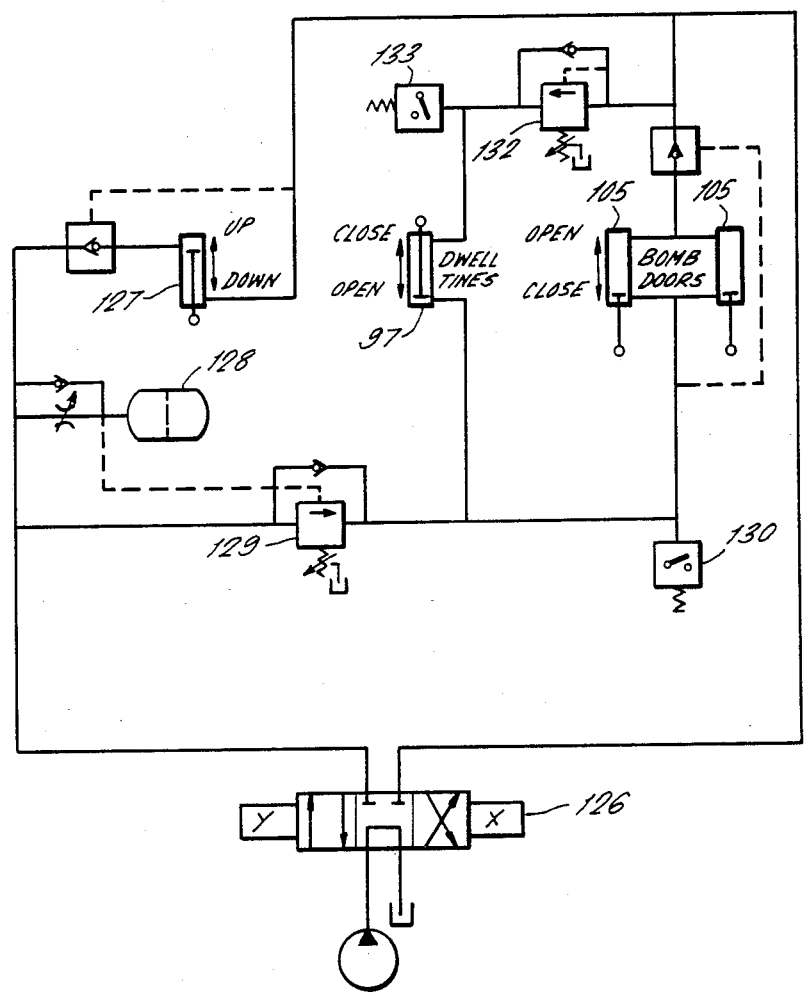
Figure 11:
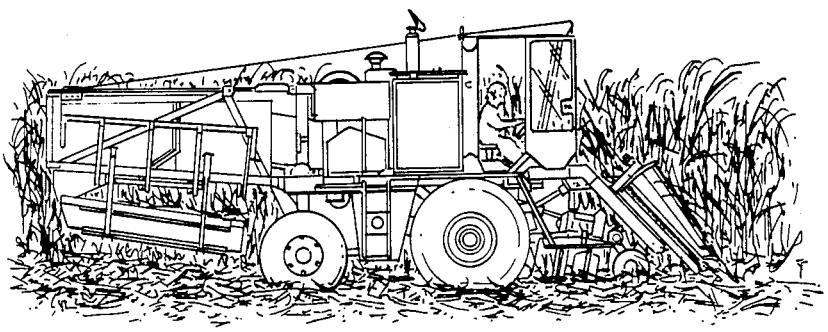
FIG. 11 is a perspective view of the harvester showing in particular, the cane collection container.

An automatic electro-hydraulic circuit (see FIGS. 9 and 10) provides automatic sequence control of the dumping cycle in the following manner. The driver operates a foot-switch to initiate the cycle which opens a hydraulic valve 126 to admit oil to the trash bar ram 127 to lower the trash bar into the position 124. After a delay caused by the time taken for the hydraulic oil supply to fill a hydraulic accumulator 128, a sequence valve 129 admits oil to the tine bar operating ram 97 and bomb door rams 105. On rise of hydraulic pressure at the end of stroke of these rams, a pressure switch 130 starts an electronic delay timer 131. After a delay necessary for the harvester to advance sufficiently for the bomb doors 62 to move clear of the deposited cane pile, the delay timer 131 reverses the valve 126 to admit oil to close the bomb door rams 105 and raise the trash bar ram 127. At the end of stroke of these rams, pressure rise operates a further sequence valve 132 to admit oil to operate the tine bar ram 97 to retract the tines 90 from the container. At the end of stroke of this ram, pressure rise operates pressure switch 133 which returns hydraulic valve 126 to neutral and so completes the cycle.

As an alternative to using time as the basis, the delays may be operated by distance travelled, distance being sensed by magnetic or other impulses derived from rotation of the driving wheels 12 or 14. A further arrangement could include an electronic counting circuit to initiate the automatic dumping cycle at appropriate distance intervals, such intervals being adjustable by the driver to suit the weight of cane being harvested per unit length of cane row.

Figure 12:
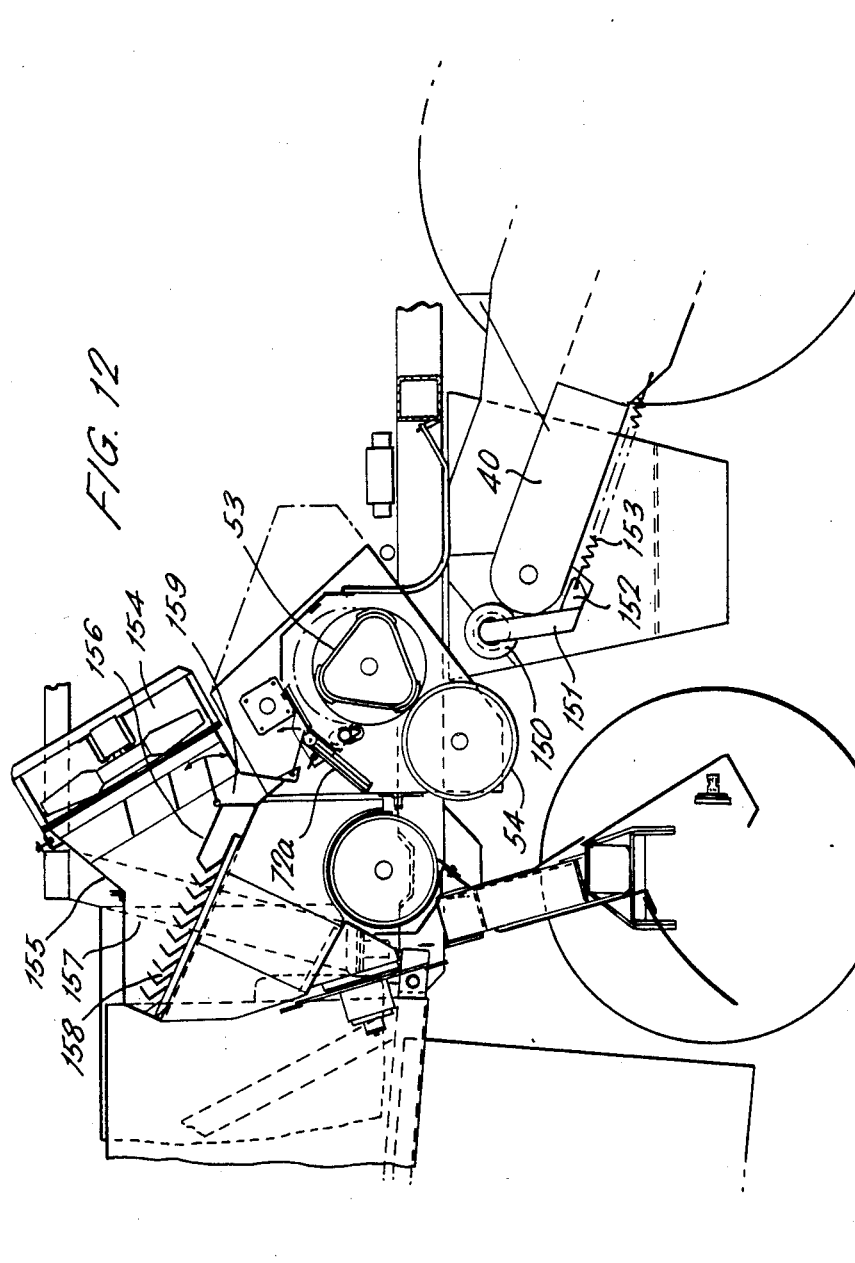
FIGS. 12 to 15 illustrate a number of modifications to the harvester.

Reference is now made to FIG. 12 of the drawings which shows a number of modifications to the embodiment described above. For the sake of convenience, like parts have been allotted the same reference numerals as those of the previously described embodiments.

Firstly, at the rearward end of the conveyor (40) a freely rotatable de-trashing roller 150 is mounted between a pair of swing arms 151 pivoted at 152 on the main support structure for the conveyor. The roller 150 is made up of a number of spaced hard rubber rings and is held in contact with the end of the conveyor by means of tension springs 153 on either side of the conveyor attached to a fixed anchorage beneath the conveyor and to the ends of the swing arms 151. The de-trashing roller thus forms a nip with the end of the conveyor which draws any free trash material from the cane as the latter is accelerated away from the conveyor by the rollers 53, 54 and ejects the trash material underneath the machine. The spring loading of the swing arms 151 supporting the de-trashing roller permits the de-trashing roller to swing away from the end of the conveyor to accommodate the trash material drawn between it and the conveyor and also to accommodate any unusually large objects such as stones or boulders which may have been drawn up on to the conveyor with the cane. Instead of a freely rotatable roller, the de-trashing roller 150 may be power driven by a hydraulic or other form of motor if required.

A further modification relates to the de-trashing tines 72a disposed, in the previously described embodiment after the rollers 53, 54. In the embodiment illustrated in FIG. 12, these de-trashing tines comprise a plurality of spaced rubber strips hanging down across the exit between the rollers 53 and 54 to comb the cane and clear any residual trash moving with it as it is ejected from the rollers towards the container.

A further modification in the arrangement of FIG. 1A lies in the arrangement of the fan. The centrifugal fan of the previously described embodiment is replaced by an axial flow motor driven fan 154 the exhaust of which is directe downwardly and rearwardly into trunking 155. A flap valve 156 which is adjustable is provided to split the air flow into a main channel 157 which passes through a grid of vanes 158 to re-direct the airflow forwardly towards the roller 53, 54 to blow trash carried back by the cane to be discharged onto the ground below assisted by the flail carrying rotor 73.

A further feature of the invention not illustrated is the provision of an automatic stop for the forward motion of the harvester in the event that the cane cutters 33 encounter an obstruction. This stop is operated by pressure rise in the supply to hydraulic motor 35 when rotation of blades 38 is hindered by the obstruction.

Figure 13:
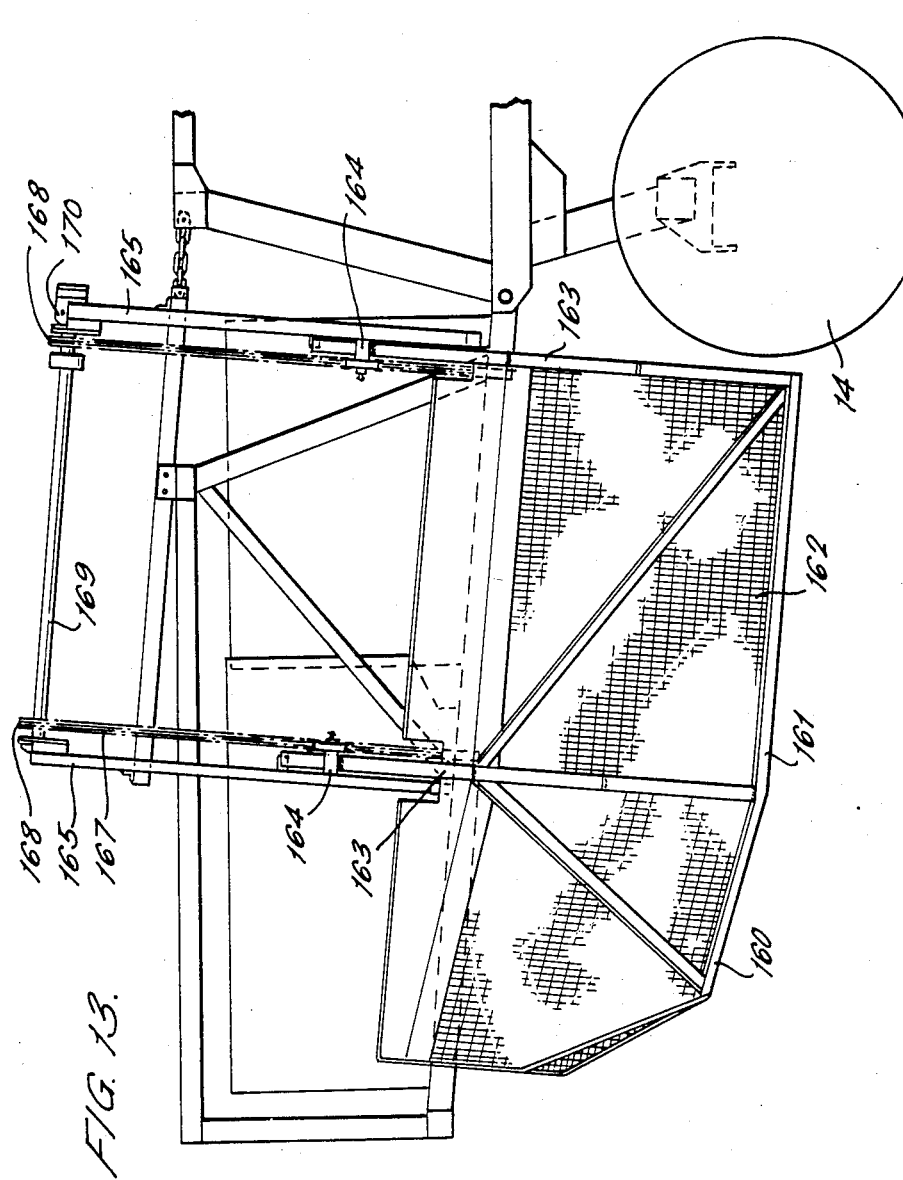
Figure 14:
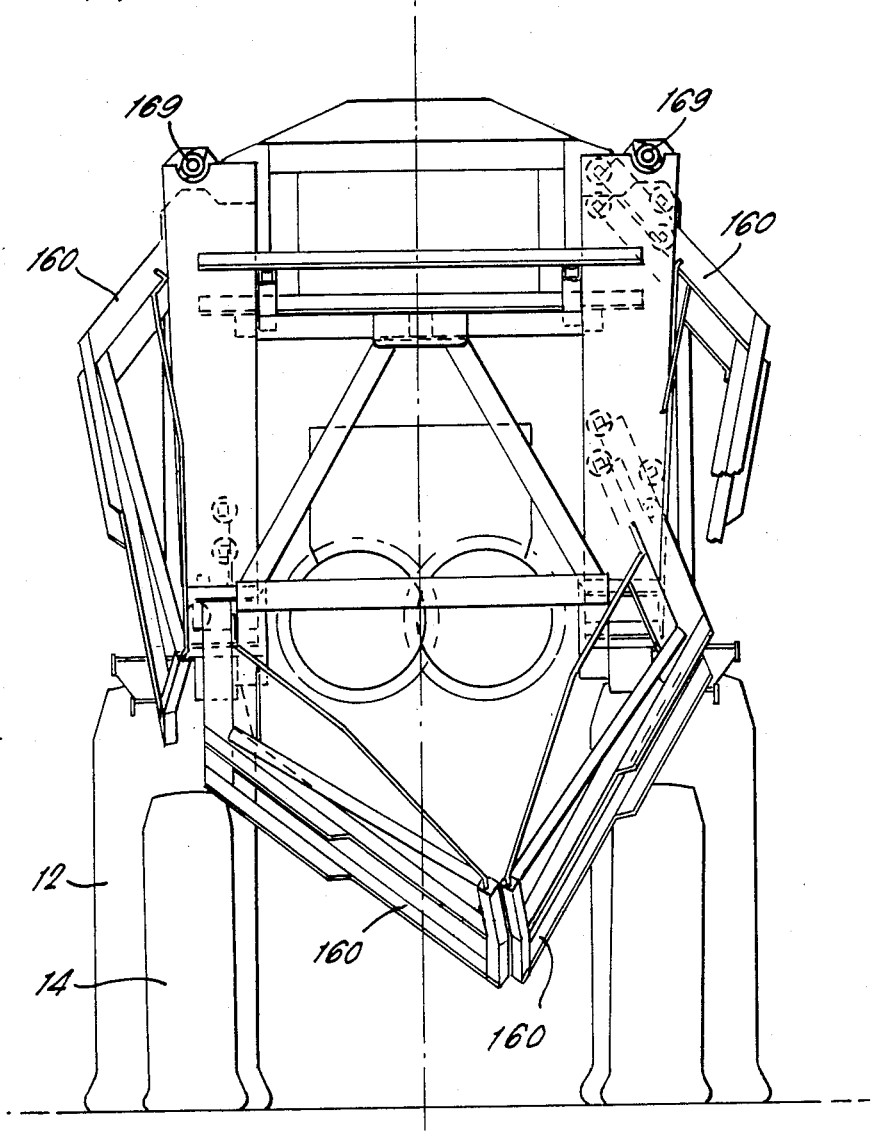
Figure 15:
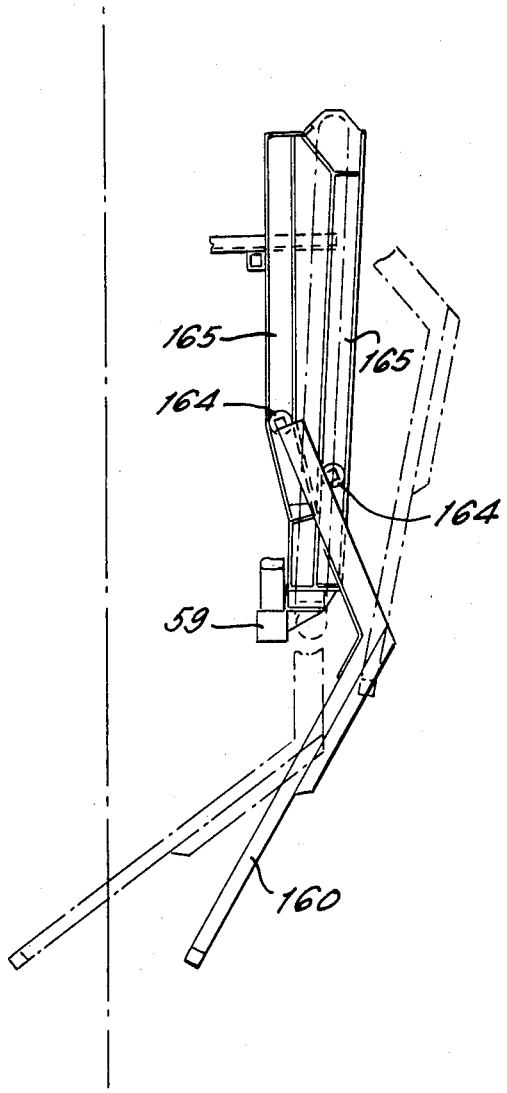

Reference is now made to FIGS. 13 to 15 of the drawings which illustrate a revised construction for the doors of the container to receive the cane. The opening bottom gate and pair of bomb doors of the previously described embodiment are replaced by a single pair of bottom doors 160 each comprising an opening metal frame 161 covered with a weld mesh grid 162. Each door has forward and rearward support arms 163 provided at their upper ends with guide members 164 which run in generally upwardly extending channels 165 to guide each door in a generally up and down direction with the bottom edge of the door swinging across the centre line as shown in FIG. 15. The doors are raised and lowered by endless chain hoists 167 extending around sprockets 168 on a shaft 169 mounted at the upper ends of the guideway members 165 and driven by a hydraulic motor 170.

The lower ends of the guideways 165 are so shaped that the point of contact of the two lower ends of the doors in their closed positions can be moved laterally of the harvester without separating the doors. The direction in which cane is discharged can be set to one side or the other side of the vehicle to leave the cane pile clear of the subsequent path of travel of the harvester. Thus with the doors biassed to the right-hand side of the vehicle as shown in FIG. 14, when the right-hand door is raised, the cane will discharge to the right of the vehicle and if the doors are biassed to the left-hand side of the vehicle and the left hand door is raised, the cane will be discharged to the left-hand side of the vehicle. Because the path of the lifting door is upward rather than outward it can be closed immediately after the cane is discharged without interfering with the deposited cane pile. This arrangement therefore allows the intermediate gate formed by the tines 90 to be eliminated.

We claim:

1. A wheeled apparatus movable in a forward direction for harvesting sugar cane, the apparatus comprising in combination:

means for cutting cane at the base thereof and for lifting the cut ends of the cane from the ground;

a container located rearwardly of said base cutting means and open at a forward end thereof for receiving cane cut ends first, and container having an adjustable barrier spaced from said forward end;

means located between said base cutting means and said container for receiving and propelling the cut cane from said base cutter means oriented with the cut cane ends first into said container until the cut cane ends engage said barrier, said barrier lying in a predetermined position in a fore and aft direction to suit the length of cane being harvested so as to leave the cane tops protruding from said open end of said container;

cutter means adjacent said open end for cutting the cane tops from the stalks; and means for discharging the cane tops from said container separately from the cane stalks.

2. The apparatus according to claim 1, wherein the adjustable barrier is faced with a cushioning material to prevent damage to the cut ends of the cane.

3. The apparatus according to claim 1, wherein the cutter means comprises at least one disc having spaced projections around its periphery to engage and sever the cane.

4. The apparatus according to claim 1, wherein the cutter means comprise at least one disc having spaced projections around its periphery to engage and displace the cane and ledge means mounted adjacent the periphery of the disc against which the cane tops are driven and severed by the projections on the disc.

5. The apparatus according to claim 3, wherein two cutting discs are provided side-by-side one another to rotate about horizontally spaced parallel axes with the adjacent peripheries of the discs overlapping each other and two ledge means are provided on either side of the pair of discs the discs being rotated outwardly to drive the cane downwardly on to one or other of the ledge means to sever the tops from the cane.

6. The apparatus according to claim 1, wherein the means for propelling the cane comprise a pair of contra-rotating power driven nip rollers located between said conveyor and said container.

7. The apparatus according to claim 1, wherein fan means are provided for directing a flow of air downwardly and/or forwardly between the propelling means and the open end of the container to remove any trash and tops released from the cane.

8. The apparatus according to claim 1, wherein a plurality of resilient tines are mounted between the propelling means and the container for separating loose trash from the moving canes at a point where it can be discharged.

9. The apparatus according to claim 1, wherein a rotary element is positioned between the propelling means and the container and having flails for assisting in discharge of trash and tops.

10. The apparatus according to claim 1, wherein a conveyor means extends upwardly and rearwardly from the base cutting means towards the propelling means.

11. The apparatus according to claim 1, wherein the base cutting means comprise a pair of contra-rotating cutters mounted to rotate about parallel upwardly extending axes, each cutter comprising a hub assembly and a number of cutter blades extending outwardly from the lower end thereof, each blade being pivotedly connected to the hub assembly in a manner which allows the blade to swing up and down relative to the hub assembly and follow the contours of the ground along which the apparatus travels.

12. The apparatus according to claim 11, wherein the base cutting means is mounted on the apparatus for up and down movement and guide means are provided for engaging the ground to maintain the base cutting means at a minimum predetermined distance from the ground.

13. The apparatus according to claim 12, wherein the guide means comprise a wheel assembly mounted on the base cutting means to support the base cutting means at a minimum predetermined distance above the ground.

14. The apparatus according to claim 13, wherein a substantial proportion of the weight of the base cutting means is transferrable to the driving axle by hydraulic means.

15. The apparatus according to claim 10, wherein said base cutting means and said conveyor means are mounted for quick release from the apparatus.

16. The apparatus according to claim 1, wherein the container has an open bottom to release the cane therefrom.

17. The apparatus according to claim 16, wherein the container is provided with a pair of cane collection doors extending lengthwise below the container over said open bottom and mounted on either side of the container, the doors abutting one another at the centre of the container in the closed condition to collect a supply of cane thereon from the container, and means provided for opening at least one of the doors so that the cane collected thereon is released to a side of the apparatus.

18. The apparatus according to claim 17, wherein the container is also provided with retractable tines positioned therebelow and above the collection doors, the tines overlapping each other at the centre of the container in the closed position, and means provided for inserting and retracting the tines to collect or release the cane.

19. The apparatus according to claim 16, wherein the container has a pair of downwardly convergent bottom doors extending lengthwise of the harvester, means provided for moving the doors together to adjust the meeting point thereof across the harvester to allow selection of discharge of cane to the side of the apparatus and to raise at least one of the doors to release cane to the selected side.

20. The apparatus according to claim 1, wherein the barrier in the container comprises an intermediate wall extending across the container and mounted for lengthwise movement along the container to receive the cut ends of the cane from the propelling means.

21. The apparatus according to claim 20, wherein indicating means are provided for the driver of the apparatus in the driving position to indicate the position of the movable barrier along the container.

22. The apparatus according to claim 1, wherein a barrier is provided which can be lowered to scape trash from the ground where cane piles are to be deposited subsequently.

23. The apparatus according to claim 1, wherein automatic means is provided to control the dumping cycle from the container after initiation by the driver of the apparatus.

24. The apparatus according to claim 23, wherein the automatic means is controlled by time measuring sensors.

25. The apparatus according to claim 23, wherein the automatic means is initiated by distance measuring sensors.

26. The apparatus according to claim 10, wherein a freely rotating roller forms a nip with the discharge end of said conveyor means to separate trash from the cane.

27. The apparatus according to claim 26, wherein the nip roller is powered.

28. The apparatus according to claim 26, wherein the roller is carried on spring-loaded swing arms.

29. The apparatus according to claim 24, wherein the automatic means is initiated by distance measuring sensors.

30. The apparatus according to claim 27, wherein the roller is carried on spring-loaded swing arms.

* * * * *